US012027145B2

(12) United States Patent
Williams

(10) Patent No.: US 12,027,145 B2
(45) Date of Patent: Jul. 2, 2024

(54) SYSTEMS, DEVICES, AND METHODS FOR COMPUTER-GENERATED MUSICAL COMPOSITIONS

(71) Applicant: Obeebo Labs Ltd., Waterloo (CA)

(72) Inventor: Colin P. Williams, Half Moon Bay, CA (US)

(73) Assignee: Obeebo Labs Ltd., Waterloo (CA)

( * ) Notice: Subject to any disclaimer, the term of this patent is extended or adjusted under 35 U.S.C. 154(b) by 627 days.

(21) Appl. No.: 17/163,303

(22) Filed: Jan. 29, 2021

(65) Prior Publication Data

US 2021/0241735 A1 Aug. 5, 2021

Related U.S. Application Data

(60) Provisional application No. 62/968,963, filed on Jan. 31, 2020.

(51) Int. Cl.
*G10H 1/00* (2006.01)
*G06F 16/65* (2019.01)
(Continued)

(52) U.S. Cl.
CPC .......... *G10H 1/0025* (2013.01); *G06F 16/65* (2019.01); *G06Q 40/12* (2013.12); *G06Q 50/184* (2013.01); *G10H 1/0008* (2013.01); *G10H 1/0041* (2013.01); *G10H 7/08* (2013.01); *G10H 2210/031* (2013.01); *G10H 2210/056* (2013.01); *G10H 2210/061* (2013.01);
(Continued)

(58) Field of Classification Search
CPC .. G10H 1/0025; G10H 1/0008; G10H 1/0041; G10H 7/08; G10H 2210/031; G10H 2210/056; G10H 2210/061; G10H 2210/071; G10H 2210/111; G10H 2210/131; G10H 2210/145; G10H 2250/005; G10H 2250/215; G06Q 40/12; G06Q 50/184; G06F 16/65
USPC .......................................................... 84/609
See application file for complete search history.

(56) References Cited

U.S. PATENT DOCUMENTS 10,629,176 B1 * 4/2020 Williams ............. G10H 1/0041
10,964,299 B1 * 3/2021 Estes .................... G10H 1/0025
(Continued)

FOREIGN PATENT DOCUMENTS

DE 202022105338 U1 * 2/2023
JP 4904971 B2 * 3/2012 ............. G09B 15/00
JP 2016136251 A * 7/2016 ............... G10G 1/04

*Primary Examiner* — Christina M Schreiber
(74) *Attorney, Agent, or Firm* — Thomas Mahon

(57) ABSTRACT

Computer-based systems, devices, and methods for generating musical compositions are described. A population of musical compositions stored in digital media are each segmented to produce abridged samples. The samples are analyzed to identify "parent" compositions that best exhibit or evoke a particular desired quality. The parent compositions are cross-bred to generate a set of child compositions which are similarly segmented and analyzed. The child compositions that best exhibit or evoke the particular desired quality are re-cast as parent compositions from which another generation of child compositions are bred. Mutations in the form of musical variations are inserted in at least some iterations and the process is repeated until at least one child composition that satisfies some exit criterion is returned.

18 Claims, 6 Drawing Sheets

(51) Int. Cl.
*G06Q 40/12* (2023.01)
*G06Q 50/18* (2012.01)
*G10H 7/08* (2006.01)

(52) U.S. Cl.
CPC .. *G10H 2210/071* (2013.01); *G10H 2210/111* (2013.01); *G10H 2210/131* (2013.01); *G10H 2210/145* (2013.01); *G10H 2250/005* (2013.01); *G10H 2250/215* (2013.01)

(56) References Cited

U.S. PATENT DOCUMENTS

| | | | |
|---|---|---|---|
| 11,024,276 B1* | 6/2021 | Dabby | G10H 1/0025 |
| 2001/0007960 A1* | 7/2001 | Yoshihara | G10H 1/0058 |
| | | | 700/94 |
| 2008/0140236 A1* | 6/2008 | Nonaka | G10H 1/0008 |
| | | | 700/94 |
| 2008/0141850 A1* | 6/2008 | Cope | G10H 1/0025 |
| | | | 84/609 |
| 2014/0260913 A1* | 9/2014 | Matusiak | G10H 1/38 |
| | | | 84/613 |
| 2014/0338515 A1* | 11/2014 | Sheffer | G10H 1/36 |
| | | | 84/609 |
| 2017/0092247 A1* | 3/2017 | Silverstein | G10H 1/368 |
| 2017/0358285 A1* | 12/2017 | Cabral | G06N 5/04 |
| 2019/0005929 A1* | 1/2019 | Dabon | G10H 1/0008 |
| 2019/0237051 A1* | 8/2019 | Silverstein | G06N 7/01 |
| 2020/0402488 A1* | 12/2020 | Williams | G10H 1/0041 |
| 2021/0090535 A1* | 3/2021 | Miles | G10H 1/0008 |
| 2021/0241735 A1* | 8/2021 | Williams | G10H 7/08 |

* cited by examiner

SYSTEMS, DEVICES, AND METHODS FOR COMPUTER-GENERATED MUSICAL COMPOSITIONS

CROSS-REFERENCE TO RELATED APPLICATION

This application claims the benefit of U.S. Provisional Patent Application Ser. No. 62/968,963, filed Jan. 31, 2020, titled "Systems, Devices, And Methods for Computer-Generated Musical Compositions", the content of which is incorporated herein in its entirety by reference.

TECHNICAL FIELD

The present systems, devices, and methods generally relate to computer-generated music, and particularly relate to generating new musical compositions and/or musical variations based on processing existing musical compositions.

BACKGROUND

Description of the Related Art

Composing Musical Compositions

A musical composition may be characterized by sequences of sequential, simultaneous, and/or overlapping notes that are partitioned into one or more tracks. Starting with an original musical composition, a new musical composition or "variation" can be composed by manipulating the "elements" (e.g., notes, bars, tracks, arrangement, etc.) of the original composition. As examples, different notes may be played at the original times, the original notes may be played at different times, and/or different notes may be played at different times. Further refinements can be made based on many other factors, such as changes in musical key and scale, different choices of chords, different choices of instruments, different orchestration, changes in tempo, the imposition of various audio effects, changes to the sound levels in the mix, and so on.

In order to compose a new musical composition (or variation) based on an original or previous musical composition, it is typically helpful to have a clear characterization of the elements of the original musical composition. In addition to notes, bars, tracks, and arrangements, "segments" are also important elements of a musical composition. In this context, the term "segment" (or "musical segment") is used to refer to a particular sequence of bars (i.e., a subset of serially-adjacent bars) that represents or corresponds to a particular section or portion of a musical composition. A musical segment may include, for example, an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition.

BRIEF SUMMARY

A computer-implemented method of generating a musical composition may be summarized as including: assigning a respective score to each musical composition in a population of musical compositions; selecting, based on their respective scores, at least two parent compositions from the population of musical compositions; generating a set of child compositions based on the at least two parent compositions; assigning a respective score to each child composition; and returning a child composition that satisfies at least one criterion.

If no child composition initially satisfies at least one criterion, then the method may further include: repeating, with each successive population of musical compositions at least including an immediately preceding set of child compositions and until a child composition that satisfies at least one criterion is returned: selecting, based on their respective scores, at least two parent compositions from the population of musical compositions; generating a set of child compositions based on the at least two parent compositions; and assigning a respective score to each child composition. At least one criterion may be selected from a group consisting of: exceeding a minimum score threshold, realizing a maximum score after a maximum number of iterations, and realizing a maximum score after a maximum number of child compositions generated. Repeating, with each successive population of musical compositions at least including an immediately preceding set of child compositions, may include repeating, with each successive population of musical compositions consisting of only the immediately preceding set of child compositions.

The method may further include applying a variation to at least one child composition before assigning a respective score to each child composition. The population of musical compositions may include at least one musical composition composed by at least one human artist. The population of musical compositions may include at least one musical composition generated by at least one computer system executing at least one algorithm for automated music composition.

Assigning a respective score to each musical composition in a population of musical compositions may include assigning a respective fitness score to each musical composition in the population of musical compositions, each respective fitness score representative of a degree to which a corresponding musical composition exhibits a particular quality. The particular quality may be selected from a group consisting of: an emotion, a genre, a mood, a style, an instrument, a culture, an ethnicity, a time period, an era, and a season.

The method may further include sampling each musical composition in the population of musical compositions. In this case, assigning a respective score to each musical composition in a population of musical compositions may include, for each musical composition in the population of musical compositions, assigning the respective score based on a corresponding sample of the musical composition. Sampling each musical composition in the population of musical compositions may include, for each musical composition in the population of musical compositions: segmenting the musical composition into a sequence of musical segments; and assembling a sample comprising a subsequence of the musical segments, the subsequence comprising a respective first subset of bars from a respective beginning of each musical segment and a respective second subset of bars from a respective end of each musical segment.

Generating a set of child compositions based on the at least two parent compositions may include, for each child composition in the set of child compositions, crossing-over musical components between at least two parent compositions to generate the child composition. For each child composition in the set of child compositions, crossing-over musical components between at least two parent compositions to generate the child composition may include swapping a musical component of a first parent composition with a corresponding musical component of a second parent composition, wherein the musical component is selected from a group consisting of: a bar, a track, a segment, a sequence of bars, a chord progression, and an orchestration.

An iterative computer-implemented method of generating a musical composition may be summarized as including: assigning a respective score to each musical composition in a population of musical compositions; until a child composition that satisfies at least one criterion is identified, repeating, with each successive population of musical compositions at least including an immediately preceding set of child compositions: selecting, based on their respective scores, at least two parent compositions from the population of musical compositions; generating a set of child compositions based on the at least two parent compositions; assigning a respective score to each child composition; and evaluating whether each child composition satisfies at least one criterion; and returning the child composition that satisfies at least one criterion. The method may further include, for each respective iteration: applying a variation to at least one child composition before assigning a respective score to each child composition.

The method may further include: sampling each musical composition in the population of musical compositions, wherein assigning a respective score to each musical composition in a population of musical compositions includes, for each musical composition in the population of musical compositions, assigning the respective score based on a corresponding sample of the musical composition; and for each iteration: sampling each musical composition in the set of child compositions, wherein assigning a respective score to each child composition includes, for each child composition, assigning the respective score based on a corresponding sample of the child composition. Sampling each musical composition in the population of musical compositions may include, for each musical composition in the population of musical compositions: segmenting the musical composition into a sequence of musical segments; and assembling a sample comprising a subsequence of the musical segments, the subsequence comprising a respective first subset of bars from a respective beginning of each musical segment and a respective second subset of bars from a respective end of each musical segment. Sampling each musical composition in the set of child compositions may include, for each child composition: segmenting the child composition into a sequence of child segments; and assembling a sample comprising a subsequence of the child segments, the subsequence comprising a respective first subset of bars from a respective beginning of each child segment and a respective second subset of bars from a respective end of each child segment.

A system for generating a musical composition may be summarized as including: at least one processor; and a non-transitory processor-readable storage medium communicatively coupled to the at least one processor, the non-transitory processor-readable storage medium storing a population of musical compositions and processor-executable instructions and/or data that, when executed by the at least one processor, cause the at least one processor to: assign a respective score to each musical composition in the population of musical compositions; select, based on their respective scores, at least two parent compositions from the population of musical compositions; generate a set of child compositions based on the at least two parent compositions; assign a respective score to each child composition; and return a child composition that satisfies at least one criterion. The system may further include processor-executable instructions and/or data that, when executed by the at least one processor, cause the at least one processor to, before returning a child composition that satisfies at least one criterion: evaluate whether at least one child composition satisfies the at least one criterion; if no child composition satisfies the at least one criterion, iteratively, with each successive population of musical compositions at least including an immediately preceding set of child compositions and until a child composition that satisfies the at least one criterion is identified: select, based on their respective scores, at least two parent compositions from the population of musical compositions; generate a set of child compositions based on the at least two parent compositions; assign a respective score to each child composition; and evaluate whether at least one child composition satisfies the at least one criterion. The system may further include processor-executable instructions and/or data that, when executed by the at least one processor, cause the at least one processor to: apply a variation to at least one child composition before assigning a respective score to each child composition.

A computer program product for generating a musical composition may be summarized as including processor-executable instructions and/or data that, when the computer program product is stored in a non-transitory processor-readable storage medium and executed by at least one processor communicatively coupled to the non-transitory processor-readable storage medium, cause the at least one processor to: assign a respective score to each musical composition in a population of musical compositions; select, based on their respective scores, at least two parent compositions from the population of musical compositions; generate a set of child compositions based on the at least two parent compositions; assign a respective score to each child composition; and return a child composition that satisfies at least one criterion.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
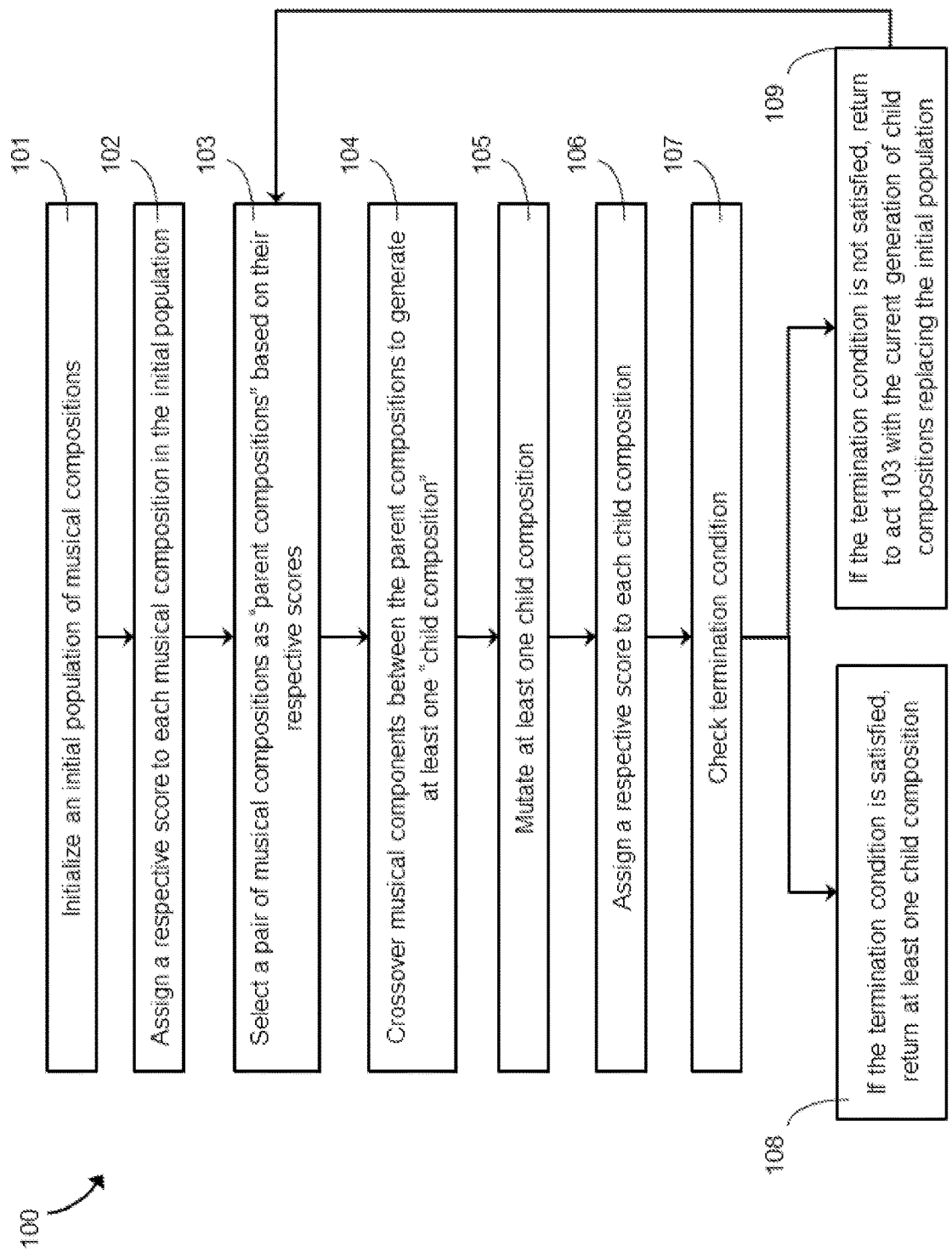
FIG. 1 is a flow diagram showing an exemplary computer-implemented method of generating a new musical composition in accordance with the present systems, devices, and methods.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide computer-based systems, devices, and methods for generating one or more new musical composition(s) based on a library or population of existing musical compositions. In some implementations, existing musical compositions are segmented and their segments are analyzed to select at least two "parent" compositions that best exhibit or evoke a particular desired quality. The parent compositions are then used to generate or "breed" a set of child compositions, and the child compositions that best exhibit or evoke the desired quality are re-cast as parents for another generation of child compositions. This process is repeated until one or more child compositions that satisfy some exit criteria is/are identified.

Systems, devices, and methods for encoding musical compositions in hierarchical data structures of the form Music[Segments{ }, barsPerSegment{ }] are described in U.S. Pat. No. 10,629,176, filed Jun. 21, 2019 and entitled "Systems, Devices, and Methods for Digital Representations of Music," which is incorporated by reference herein in its entirety.

Systems, devices, and methods for automatically identifying the musical segments of a musical composition and which can facilitate encoding musical compositions (or even simply undifferentiated sequences of musical bars) into the Music[Segments{ }, barsPerSegment{ }] form described above are described in U.S. patent application Ser. No. 16/775,241, filed Jan. 28, 2020 and entitled "Systems, Devices, and Methods for Segmenting a Musical Composition into Musical Segments," which is incorporated herein by reference in its entirety.

Systems, devices, and methods for identifying harmonic structure in digital data structures and for mapping the Music[Segments{ }, barsPerSegment{ }] data structure into an isomorphic HarmonicStructure[Segments{ }, harmonicSequencePerSegment{ }] data structure are described in US Patent Publication No. 2020-0402488, filed Jan. 28, 2020 and entitled "Systems, Devices, and Methods for Harmonic Structure in Digital Representations of Music," which is incorporated herein by reference in its entirety.

The various embodiments described herein include systems, devices, and methods for, among other things, using Music[Segments{ }, barsPerSegment{ }] data structures and HarmonicStructure[Segments{ }, harmonicSequencePerSegment{ }] data structures to create, compose, and/or generate variations of the note sequences within the musical bars (i.e., within the bar data objects encoded in the data structures) and thereby generate: i) new musical compositions that are variations on an original musical composition; and/or ii) new musical compositions that are, for all intents and purposes, original musical compositions.

Throughout this specification and the appended claims, reference is often made to a "data object." Unless the specific context requires otherwise, the term "data object" is used herein to refer to a collection or set of data that is combined or amalgamated into a discretely addressable object. A data object may exist in the source code, object code, computer code, and/or program code of a computing environment where it is defined, interpreted, and manipulated, and a data object may have an analog or physical counterpart in the non-transitory processor-readable storage medium where it is stored and called or operated upon. In this case, "encoding" a component of a musical composition in a data object may include writing, by at least one processor, the component to the data object in the non-transitory processor-readable storage medium and/or forming, by at least one processor, the component(s) in the data object stored in the non-transitory processor-readable storage medium. One data object may include (e.g., contain, encompass, reference, or invoke) one or more additional data object(s).

Throughout this specification and the appended claims, unless the specific context requires otherwise the general term "data object" is used to refer to any (either individually or in multiplicity) of the different types of data objects that are used to encode digital music, including but not limited to those that are encoded (or may be encoded) in a Music[Segments{ }, barsPerSegment{ }] data structure and/or in a HarmonicStructure[Segments{ }, harmonicSequencePerSegment{ }] data structure, such as a bar data object, a track data object, a segment data object, and/or a Music[ ] data object. Thus, unless the specific context requires otherwise, reference to a note variation being applied to or within a "data object" is generally applicable to all such data object types. Furthermore, the significance or impact a note variation has on an overall musical composition may depend on the scale of the data object to which it is applied (e.g., a note variation applied in one bar data object may be less significant or impactful than a note variation applied across an entire segment data object).

The various embodiments described herein include computer-based systems, devices, and methods for generating new musical compositions by "breeding" existing musical compositions. In some implementations, an evolutionary programming paradigm may be employed wherein a human user serves the role of the "fitness function."

FIG. 1 is a flow diagram showing an exemplary computer-implemented method 100 of generating a new musical composition in accordance with the present systems, devices, and methods. Method 100 includes nine acts 101, 102, 103, 104, 105, 106, 107, 108, and 109, though some iterations of method 100 may include multiple iterations of certain acts. Those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, an initial population of musical compositions is initialized (e.g., by at least one processor and/or within a computing environment of at least one processor-based computing system). Any number of musical compositions may be included in the initial population (though ideally more than one for the purposes of method 100) and each musical composition in the initial population may have been generated or composed by any of a variety of means, including without limitation: by one or more human artist(s) or composer(s), by any known system or algorithm for generating musical compositions, and/or by any of the systems or algorithms for generating/varying musical compositions described in the present systems, devices, and methods.

At 102, a respective score is assigned to each musical composition in the initial population. The scores may be provided by a human user who listens to each composition, or the scores may be provided by an automated computer-based method, or the scores may be provided by a combination of a human user and automated methods. When the scores are provided by a human user, "assigning a respective score to each musical composition" at 102 may include receiving, by the at least processor or by the processor-based computing system, an assignment of a respective score for each musical composition. The scores may be qualitative, quantitative, numeric, ordinal, and/or symbolic, and generally each score may provide an indication of the "fitness" of a corresponding musical composition (in relation to some criterion) or "how the musical composition sounds." For example, if an implementation of method 100 is intended to produce a happy musical composition, then at 102 the musical compositions in the initial population may be scored (either by a human user, by an automated algorithm, or by a combination of a human user and an automated algorithm) based on how "happy" they sound with, e.g., a composition that sounds more happy having a higher score and a composition that sounds less happy having a lower score. Happiness is just one example of a scoring metric applicable to method 100, while in accordance with the present systems, devices, and methods many other criteria may be scored at 102, such as: genre (rock, hip-hop, classical, etc.), style, similarity to a target style, mood, instrument, culture, ethnicity, time period, era, season, and so on.

A person of skill in the art will appreciate that it can be tedious for a human user to listen to each musical composition in its entirety in order to score the initial population at 102 (in implementations in which a human user is involved in scoring the initial population, that is). The various implementations described herein include systems, devices, and methods for sampling (e.g., selecting contiguous subsequences of musical bars from) musical compositions that may, for example, be used to help a user quickly score the initial population at 102 of method 100. To achieve such sampling, a musical composition may first be segmented into musical segments according to the teachings of U.S. patent application Ser. No. 16/775,241 and then a set of subsequences of bars may be assembled, the set of subsequences comprising, for example: the first N bars of the first musical segment; the last N bars of the first musical segment; the first N bars of the second musical segment; the last N bars of the second musical segment; the first N bars of the third musical segment; and so on, up to and including the first N bars of the last musical segment and the last N bars of the last musical segment (where N is an integer greater than or equal to 1). In this way, an abridged version of the musical composition that nevertheless includes many of the main musical and/or harmonic features of the musical composition may be constructed. In some implementations, the value for N may be constant across all segments in the sample, whereas in other implementations a different value for N may be used for different segments within the same sample (e.g., for the first segment N=6 and or the last segment N=3).

At 103 a pair of musical compositions from the initial population is selected as "parent compositions" based on their respective scores (assigned at 102). Each musical composition in the pair of musical compositions may advantageously have a high respective score (e.g., the highest two scores).

At 104, various musical components or "elements" are crossed over between the parent compositions to generate at least one "child composition." The musical elements that are crossed over between parent compositions may include any musical components or elements of the parent compositions. For example, if the parent compositions are each encoded in a respective hierarchical .hum data structure (per U.S. Pat. No. 10,629,176), then various data objects (e.g., note data object, bar data objects, segment data objects, track data objects, and/or any of the like) may be swapped between parent compositions at 104. Act 104 may be analogous to a sexual reproductive operation wherein the MUSIC[ . . . ] objects for PARENT1 and PARENT2 play a role analogous to that of DNA in biological systems.

As a more detailed example, if a first parent composition PARENT1=Music[element1, barsPerElement1] and a second parent composition PARENT2=Music[elements2, barsPerElement2], then crossing over between parent compositions at 104 may include any or all of:

1. Cross or swap track_i of PARENT1 with track) of PARENT2;
2. Cross or swap segment_i of PARENT1 with segment) of PARENT2;
3. Cross or swap bar_i of PARENT1 with bar) of PARENT2;
4. Cross or swap a sequence of bars, bars of PARENT1 with a sequence of bars, bars_[p . . . q] of PARENT2;
5. Cross or swap a chord progression within PARENT1 with a chord progression within PARENT2; and/or
6. Cross or swap over the orchestration (instrument per track), or part thereof, of PARENT1 with the orchestration (instrument per track), or part thereof, of PARENT2.

Throughout the above, in some implementations i=j and in some implementations i≠j. In some implementations, if elements being crossed or swapped are not of equal length then the elements may be adjusted to become of equal length. For example, in crossing or swapping the sequence of bars_[i . . . j] of PARENT1 with the sequence of bars_[p . . . q] of PARENT2, if they are not of equal length then the smaller can be adjusted to the larger by inserting duplicates of bars within the smaller until it is equal in length to the larger. Alternatively, bars can be deleted from the larger until it is of the same size as the smaller.

At 105, at least one child composition from 104 is mutated, e.g., by at least one processor. A child composition may be mutated by applying at least one variation to the child composition, and/or by generating at least one variation of the child composition. Variations may be applied and/or generated using a range of different approaches, including without limitation any of the systems and methods for varying musical compositions described herein and/or in US Patent Publication No. 2020-0402487, and/or in U.S. patent application Ser. No. 17/162,659, filed Jan. 29, 2021 and entitled "Systems, Devices, and Methods for Decoupling Note Variation and Harmonization in Computer-Generated Variations of Music Data Objects", and/or in U.S. patent application Ser. No. 17/163,214, filed Jan. 29, 2021 and entitled "Systems, Devices, and Methods for Computer-Generated Musical Note Sequences", each of which is incorporated herein by reference in its entirety. Act 105 may be analogous to an asexual mutation of genes or genetic code in biological systems.

At 106, a respective score is assigned to each child composition in a substantially similar way to that described for act 102.

At 107, a termination condition for method 100 is evaluated. That is, at the outset method 100 may be established to have some particular objective or criteria and at 107 it is evaluated whether or not such objective or criteria has/have been met. Exemplary termination conditions that may be checked at 107 include, without limitation: does the score of at least one child composition satisfy some criterion (e.g., above a threshold in whatever scores are being assessed, with respect to, e.g., genre, mood, seasonal feel, era feel, etc.)?, has a threshold number of child compositions been generated?, and/or has a threshold number of generations of child compositions been generated? If the termination condition checked at 107 is satisfied then method 100 proceeds to act 108; if the termination condition checked at 107 is not satisfied then method 100 proceeds to act 109.

If the termination condition is found to be satisfied at 107, then at 108 at least one child composition is returned as the output of method 100 and method 100 ends. That is, if act 108 is carried out then method 100 does not proceed to act 109 and the new musical composition generated by method 100 is the at least one child composition that satisfies the termination condition.

If the termination condition is found not to be satisfied at 107, then method 100 skips act 108 and instead proceeds to act 109. At 109, method 100 returns to act 103 with the current generation of child compositions replacing the initial population. That is, if the termination condition is found not to be satisfied at 107, then method 100 proceeds to repeat or iterate acts 103, 104, 105, 106, 107, and (either) 108 or 109 (depending on the results at 107) using the most recent generation of child compositions generated at the most recent iteration of acts 104 and 105 in lieu of the initial population. In this way, successive generations of child compositions may be generated (103, 104, and 105), scored (106), and assessed (107) until the termination condition assessed at 107 is ultimately satisfied.

Figure 2:
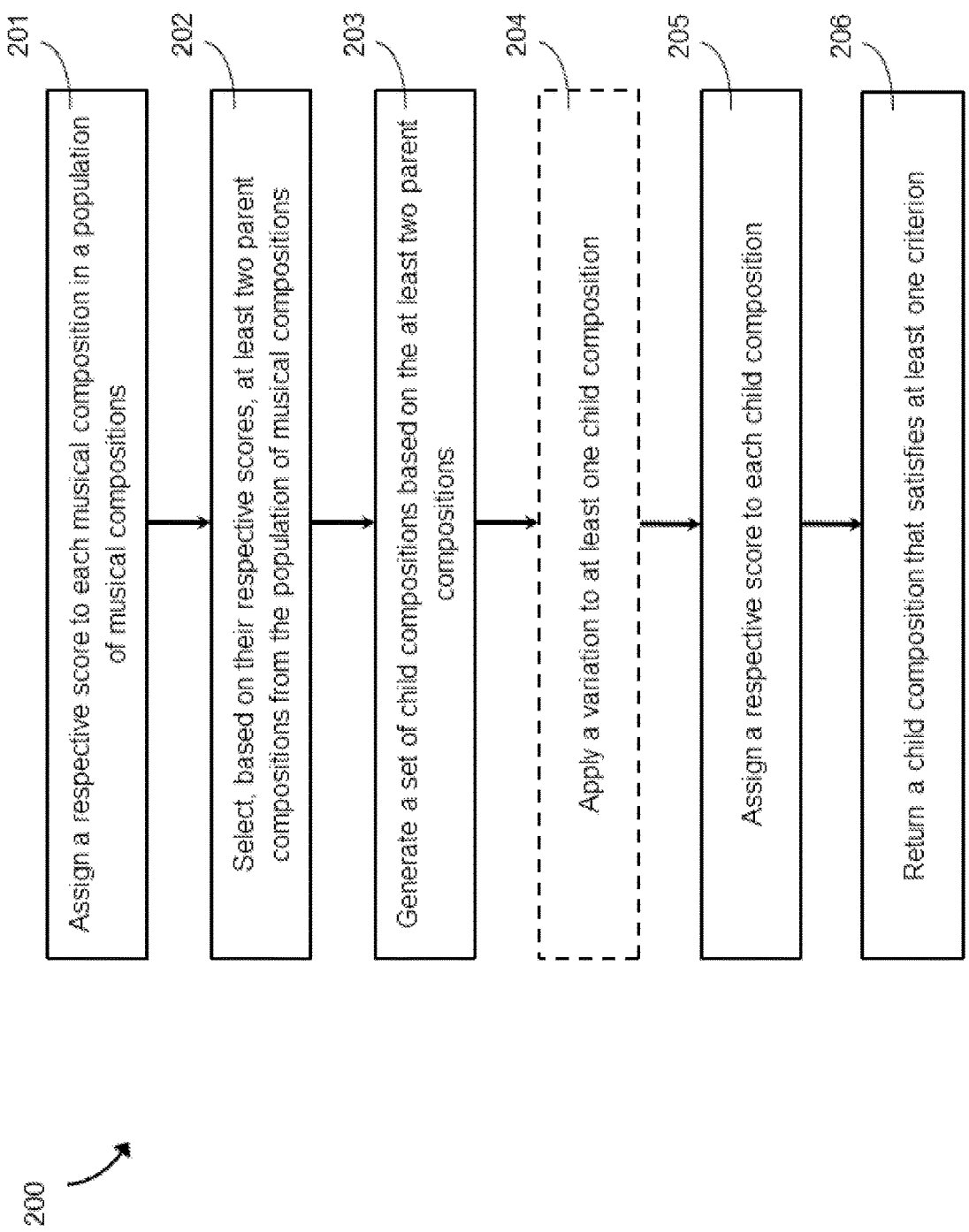
FIG. 2 is a flow diagram showing another exemplary computer-implemented method of generating a musical composition in accordance with the present systems, devices, and methods.
Figure 6:
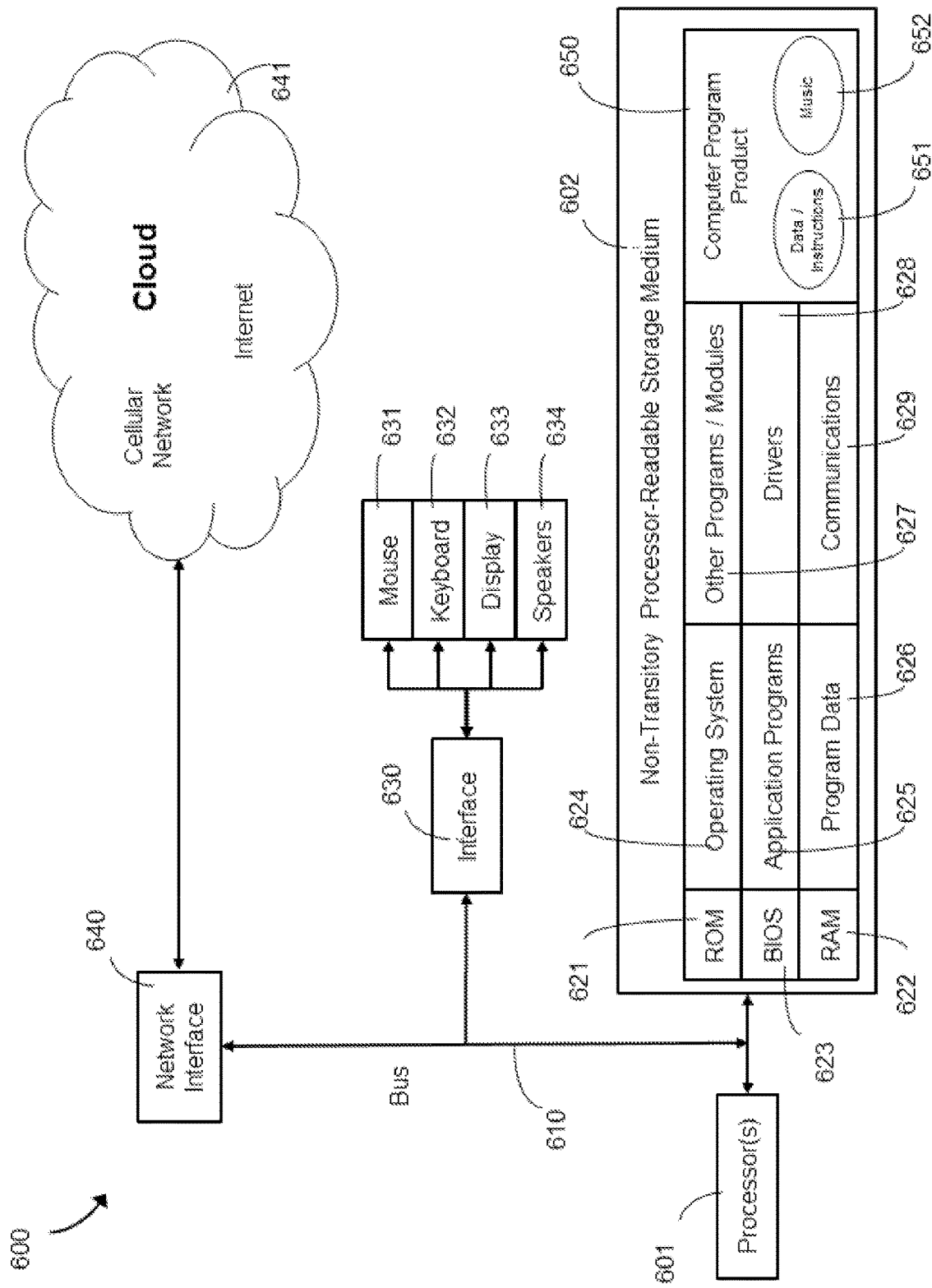
FIG. 6 is an illustrative diagram of a processor-based computer system suitable at a high level for performing the various computer-implemented methods described in the present systems, devices, and methods.

FIG. 2 is a flow diagram showing an exemplary computer-implemented method 200 of generating a musical composition in accordance with the present systems, devices, and methods. In general, throughout this specification and the appended claims, a computer-implemented method is a method in which the various acts are performed by one or more processor-based computer system(s). For example, certain acts of a computer-implemented method may be performed by at least one processor communicatively coupled to at least one non-transitory processor-readable storage medium or memory (hereinafter referred to as a non-transitory processor-readable storage medium) and, in some implementations, certain acts of a computer-implemented method may be performed by peripheral components of the computer system that are communicatively coupled to the at least one processor, such as interface devices, sensors, communications and networking hardware, and so on. The non-transitory processor-readable storage medium may store data and/or processor-executable instructions that, when executed by the at least one processor, cause the computer system to perform the method and/or cause the at least one processor to perform those acts of the method that are performed by the at least one processor. FIG. 6 and the written descriptions thereof provide illustrative examples of computer systems that are suitable to perform the computer-implemented methods described herein.

Returning to FIG. 2, method 200 includes six acts 201, 202, 203, 204, 205, and 206, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. As will be discussed later on, act 204 is an explicitly optional act.

At 201, a respective score is assigned to each musical composition in a population of musical compositions. As previously described, each respective score may be assigned by an automated scoring algorithm executed by at least one processor, or each respective score may be assigned by a combination of a human user and a semi-automated scoring algorithm executed by at least one processor, or each respective score may be assigned completely manually by a human user. In implementations where each respective score is assigned completely manually by a human user, at 201 "assigning" a respective score to each musical composition may include receiving (e.g., by at least one processor) the respective score for each musical composition in the population of musical compositions. Whether assigned directly by at least one processor or assigned by a human user and received by at least one processor, each respective score may correspond to a respective fitness score representative of a degree to which the corresponding musical composition exhibits or evokes a particular quality. Examples of suitable qualities that may be evaluated or assessed at 201 as the basis for assigning each fitness score, where the fitness score represents the degree to which a musical composition exhibits or evokes the quality, include, without limitation: an emotion, a genre, a mood, a style, an instrument, a culture, an ethnicity, a time period, and a season.

In some implementations, assigning scores to musical compositions at 201 may adopt the teachings of U.S. patent application Ser. No. 17/163,282, filed Jan. 29, 2021, and entitled "Systems, Devices, and Methods for Assigning Mood Labels to Musical Compositions", which is incorporated by reference herein in its entirety. For example, the systems, devices, and methods described therein for automatically segmenting and mood-classifying musical compositions based on features in their respective digital data objects and/or features in their respective audio waveforms may be adopted in the present systems, devices, and methods and applied to automatically (i.e., without human intervention) measure, evaluate, or otherwise determine to what degree (e.g., "how much") a given musical composition exhibits or evokes a particular mood, especially if the particular mood is what is being evaluated at 201 to determine and assign a score to the musical composition.

In some implementations, the respective scores assigned at 201 may be binary, as in pass/fail, yes/no, acceptable/unacceptable. In such implementations, musical compositions that receive a "passing" score may be deployed in subsequent acts of method 200 and musical compositions that do not receive a "passing" score may be discarded or omitted form the population of musical compositions.

Initially in method 200, the population of musical compositions for which scores are assigned at 201 may comprise any set or library of like or unalike musical compositions depending on the specific implementation. In some implementations, the population of musical compositions may include at least one musical composition composed by at least one human artist or group (band) of human artists. In some implementations, the population of musical compositions may include at least one musical composition generated by at least one computer system executing at least one algorithm for automated music composition. If it is desired for an implementation of method 200 to produce or generate a musical composition exhibiting or evoking a particular quality, then in such implementation of method 200 the population of musical compositions may advantageously be chosen or selected to consist of musical compositions that are known to exhibit or evoke the particular quality. For example, if it is desired for an implementation of method 200 to generate a musical composition that "sounds like" a rock song, then advantageously the population of musical compositions for which scores are assigned at 201 may consist of rock songs, whereas if it is desired for an implementation of method 200 to generate a musical composition that "sounds like" a sad song, then advantageously the population of musical compositions for which scores are assigned at 201 may consist of sad songs.

At 202, at least two parent compositions are selected, e.g., by at least one processor, from the population of musical compositions. The at least two parent compositions are selected based, e.g., either deterministically or probabilistically, on their respective scores assigned at 201. For example, the at least two parent compositions that are selected, e.g., by at least one processor, at 202 may deterministically include the at least two parent compositions that had the highest or best scores assigned at 201, or probabilistically include at least two parents having another highest or best metric that is weighted by their respective scores.

At 203, a set of child compositions is generated, e.g., by at least one processor, based on the at least two parent compositions. As previously described, the set of child compositions may be generated by, for each child composition, crossing-over musical components between at least two parent compositions to generate the child composition. For example, a musical component of a first parent composition may be swapped, e.g., by at least one processor, with a corresponding musical component of a second parent composition. Depending on the specific implementation, the musical component that is "swapped" between two parent compositions to generate a child composition may include: a bar (e.g., a bar from a first parent is swapped with a bar from a second parent), a track (e.g., a track from a first parent is swapped with a track from a second parent), a segment (e.g., a segment from a first parent is swapped with a segment from a second parent), a sequence of bars (e.g., a bar sequence from a first parent is swapped with a bar sequence from a second parent), a chord (e.g., a chord from a first parent is swapped with a chord from a second parent), a chord progression (e.g., a chord progression from a first parent, either in its entirety or only in part, is swapped with a chord progression from a second parent, either in its entirety or only in part), and an orchestration (e.g., an orchestration from a first parent is swapped with an orchestration from a second parent).

Act 204 of method 200 is an explicitly optional act. That is, while any of acts 201, 202, 203, 204, 205, and/or 206 may be altered or omitted in various implementations of the present systems, devices, and methods, act 204 is specifically one that may or may not be included in method 200 depending on the specific implementation. For example, in some implementations of method 200 one or more child composition(s) generated at 203 may be sufficiently distinct from the parent composition(s) such that no further adjustments or modifications are necessary in order to proceed to act 205; however, in other implementations it can be advantageous to introduce additional musical distinctiveness (relative to the parent compositions) to at least one child composition in order to support or enhance the distinctiveness of the musical composition ultimately generated by method 200. Thus, in implementations of method 200 where distinctiveness is desired, or where it is desired to explore additional musical variations, method 200 may include optional act 204.

At 204, a musical variation is applied to at least one child composition. In some implementations, the musical variation applied at 204 may be a form of "mutation" applied to the at least one child composition, similar to act 105 from method 100. The musical variation may be applied using any known technique for varying musical compositions and/or generating variations of musical compositions, such as without limitation those described in: US Patent Publication No. 2020-0402487, U.S. patent application Ser. No. 17/162,659, and/or U.S. patent application Ser. No. 17/163,214. As a further example, the musical variation may be applied as follows: i) analyze the harmonic structure of at least one bar of the child composition, e.g., by applying the teachings of US Patent Publication No. 2020-0402488; and ii) use a neural network model to generate a new note sequence for the at least one bar based on its harmonic structure from i). Depending on the implementation, steps i) and ii) may be performed for a single bar in the at least one child composition, for multiple bars in the at least one child composition, or for all of the bars in the at least one child composition.

At 205, a respective score is assigned to each child composition. Similar to act 201, at 205 the respective scores may be assigned automatically by a computer-executed algorithm, semi-automatically by a computer algorithm with input from a human user, or completely manually by a human user. In implementations where each respective score is assigned manually by a human user, assigning each respective score at 201 may include receiving each respective from the user by at least one processor.

Also similar to 201, in some implementations the scores assigned at 205 may be "fitness scores" that represent the degree to which a child composition exhibits or evokes a particular quality. Generally, in most implementations of method 200 the same scoring system, methodology, and/or criteria used to assign scores to musical compositions at 201 is applied to assign scores to child compositions at 205.

In some implementations, the musical variation applied to at least one child composition at 204 may be deliberately structured to increase the likelihood that the child composition will receive a higher score at 205. For example, if the child compositions are being scored for happiness at 205, then the variation applied at 204 may purposefully convert a minor chord progression into a major chord progression. Generally, the teachings in U.S. patent application Ser. No. 17/163,282 may be applied to focus the expected effect of variations at 204, in some implementations.

At 206, a child composition that satisfies at least one criterion is returned, e.g., by at least one processor, as the musical composition generated by the implementation of method 200. An example of a suitable criterion is a minimum score threshold, where at 206 a child composition that has a score (assigned at 205) that exceeds the minimum score threshold is returned as the musical composition generated by the implementation of method 200. In some implementations, the child composition having the highest or best score may be returned at 206 (i.e., regardless of whether such score exceeds a minimum threshold).

In some implementations of the present systems, devices, and methods, simply running through acts 201, 202, 203, 204, 205, and 206 one time and returning the child composition that has the highest score may be sufficient; however, in other implementations of the present systems, devices, and methods, no child composition will initially satisfy the at least one criterion and therefore no child composition is returned at 206. In implementations for which no child composition satisfies the at least one criterion, method 200 may advantageously be repeated or iterated with the set of child compositions from acts 203, 204, and 205 of the first iteration of method 200 added to or replacing the population of musical compositions at 202. In other words, in accordance with the present systems, devices, and methods, if no child composition satisfies the at least one criterion at 206 then method 200 may be iterated until a child composition satisfies the at least one criterion.

Figure 3:
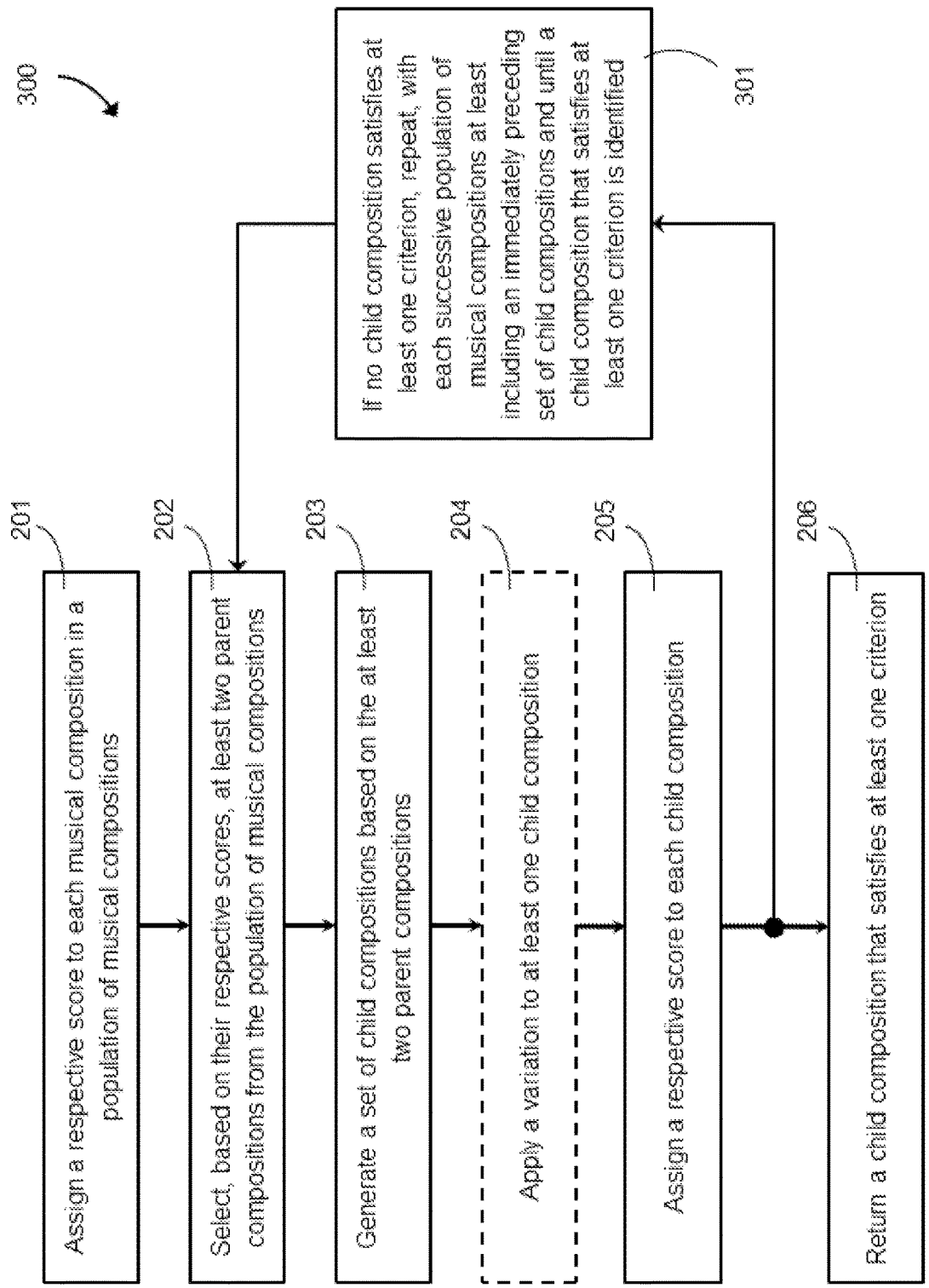
FIG. 3 is a flow diagram showing another exemplary computer-implemented method of generating a musical composition in accordance with the present systems, devices, and methods.

FIG. 3 is a flow diagram showing an exemplary computer-implemented method 300 of generating a musical composition in accordance with the present systems, devices, and methods. Method 300 includes acts 201, 202, 203, 204 (optional), 205, and 206 from method 200 with acts 202, 203, 204 (optional), and 205 enclosed in an iteration loop described at 301.

At 301, acts 202, 203, 204 (optional), and 205 are repeated, with each successive population of musical compositions from which parent compositions are selected at a current iteration of 202 at least including an immediately preceding set of child compositions from a previous iteration of 205. In some implementations, the set of child compositions from the previous iteration of 205 may completely replace the previous population of musical compositions from which parent compositions were selected in the previous iteration of 202 and the parent compositions in the current iteration of 202 may be selected from the set of child compositions from the previous iteration of 205.

In some implementations, optional act 204 may be carried out in some iterations and skipped or omitted in other iterations. That is, act 204 may remain optional in each iteration at 301 independent of whether act 204 is included in any preceding or succeeding iteration.

Act 301 specifies that acts 202, 203, 204 (optional), and 205 are repeated until a child composition that satisfies the at least one criterion is identified. When a child composition that satisfies the at least one criterion is identified, method 300 proceeds to act 206 and a child composition that satisfies at least one criterion is returned (e.g., as the musical composition generated by the implementation of method 300).

In method 300, the at least one criterion that must be satisfied in order for a child composition to be returned at 206 may be or include a minimum score threshold as described for method 200. However, because method 300 is an iterative method, the at least one criterion that must be satisfied at 206 may alternatively (or additionally) include at least one criterion related to the iteration cycles of method 300. For example, the at least one criterion at 206 of method 300 may include either or both of realizing a maximum score after a maximum number of iterations and/or realizing a maximum score after a maximum number of child compositions generated. In some implementations, the at least one criterion may include a set of criteria and method 300 may continue to iterate until a child composition that satisfies at least one criterion from the set of criteria is identified, which causes the iteration loop characterized at 301 to terminate and method 300 to proceed to act 206, at which the child composition that satisfies the at least one criterion is returned.

Method 300 provides an adaptation to method 200 in order to render method 200 iterative. A similar method that is formulated as iterative from the outset is illustrated in FIG. 4.

Figure 4:
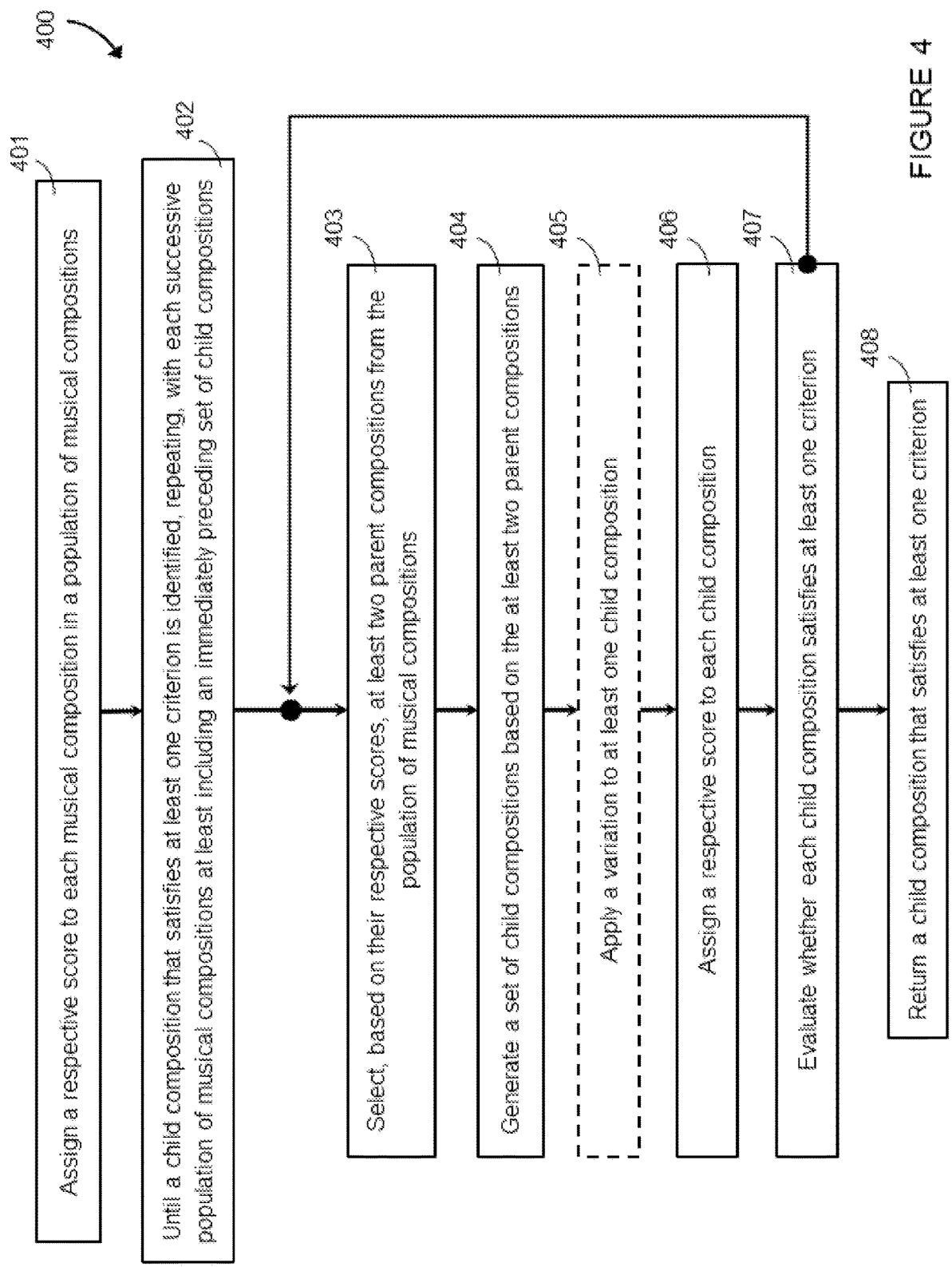
FIG. 4 is a flow diagram showing an exemplary iterative computer-implemented method of generating a musical composition in accordance with the present systems, devices, and methods.

FIG. 4 is a flow diagram showing an exemplary iterative computer-implemented method 400 of generating a musical composition in accordance with the present systems, devices, and methods. Method 400 includes eight acts 401, 402, 403, 404, 405, 406, 407, and 408 though those of skill in the art will appreciate that in alternative implementations certain acts may be omitted and/or additional acts may be added. Those of skill in the art will also appreciate that the illustrated order of the acts is shown for exemplary purposes only and may change in alternative implementations. Similar to act 204 from method 200, act 405 in method 400 is an explicitly optional act.

At 401, a respective score is assigned, e.g., by at least one processor, to each musical composition in a population of musical compositions. Act 401 of method 400 is substantially similar to act 201 of method 200.

At 402, an iteration loop is initiated. Specifically, at 402 parameters are defined for iteration of acts 403, 404, 405, 406, and 407. The parameters defined at 402 are: until a child composition that satisfies at least one criterion is identified, repeat acts 403, 404, 405, 406, and 407, with each successive population of musical compositions at least including an immediately preceding set of child compositions. Thus, the following descriptions of acts 403, 404, 405, 406, and 407 apply for each iteration of acts 403, 404, 405, 406, and 407 until a child composition that satisfies at least one criterion is identified per 402.

At 403, at least two parent compositions are selected, e.g., by at least one processor, from the population of musical compositions based on their respective scores. Act 403 of method 400 is substantially similar to act 202 of method 200.

At 404, a set of child compositions is generated, e.g., by at least one processor, based on the at least two parent compositions. Act 404 of method 400 is substantially similar to act 203 of method 200.

At 405, a variation is applied, e.g., by at least one processor, to at least one child composition. Act 405 of method 400 is optional and substantially similar to act 204 of method 200.

At 406, a respective score is assigned, e.g., by at least one processor, to each child composition. Act 406 of method 400 is substantially similar to act 205 of method 200.

At 407, whether at least one child composition satisfies at least one criterion is evaluated, e.g., by at least one processor. If no child composition that satisfies at least one criterion is identified at 407, then the parameters for iterating acts 403, 404, 405, 406, and 407 as set out at 402 continue to be true and so method 400 returns from act 407 back to act 403; however, in the next iteration of acts 403, 404, 405, 406, and 407, the set of child compositions from the current iteration of act 406 are added to or re-cast as the population of musical compositions from which at least two parent compositions are selected at the next iteration of act 403. On the other hand, if a child composition that satisfies at least one criterion is identified at 407, then the parameters for iterating acts 403, 404, 405, 406, and 407 as set out at 402 cease to be true and so method 400 exits the iteration of acts 403, 404, 405, 406, and 407 and proceeds to a single instance of act 408.

At 408, the child composition that satisfies at least one criterion is returned, e.g., by at least one processor, as the musical composition generated by the implementation of method 400.

As previously described, in accordance with the present systems, devices, and methods scores may be assigned to musical (parent or child) compositions based on a respective sample of each composition rather than based on the composition in its entirety. The implementation of samples in this way can reduce the burden of having to review and analyze entire compositions in order to assign scores; thus, each sample is advantageously shorter in duration than the composition to which it corresponds (or from which it has been extracted). While it is generally the case that samples may be used in lieu of complete musical compositions in all of the "assigning a score" acts of methods 100, 200, 300, and 400, an example of a method that explicitly uses samples is illustrated in FIG. 5.

Figure 5:
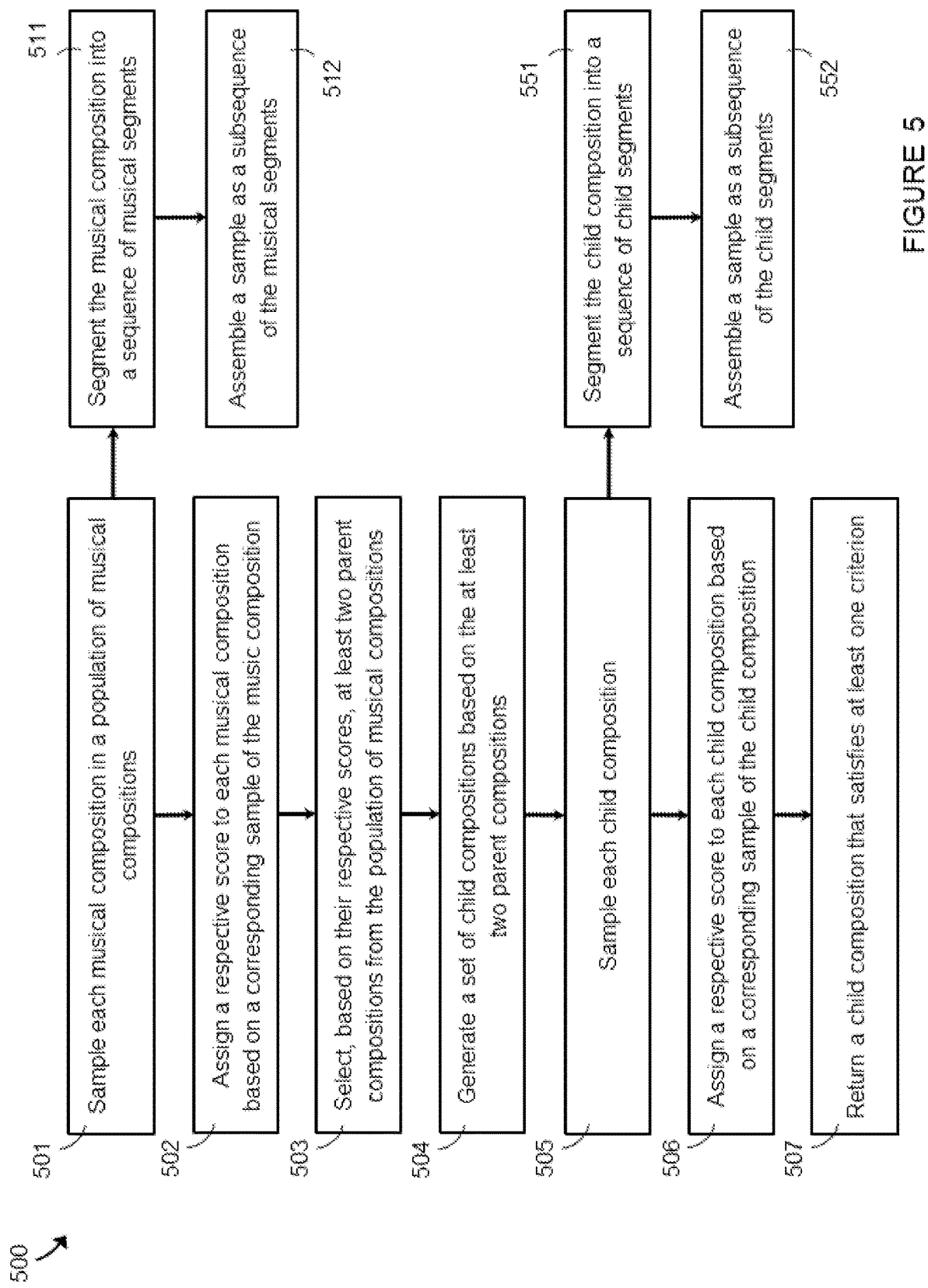
FIG. 5 is a flow diagram showing another exemplary computer-implemented method of generating a musical composition in accordance with the present systems, devices, and methods.

FIG. 5 is a flow diagram showing another exemplary computer-implemented method 500 of generating a musical composition in accordance with the present systems, devices, and methods. Method 500 includes seven acts 501, 502, 503, 504, 505, 506, and 507, and four sub-acts 511, 512, 551, and 552, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 501, each musical composition in a population of musical compositions is sampled, e.g., by at least one processor. An exemplary process by which each musical composition is sampled at 501 is described in sub-acts 511 and 512. In other words, in method 500 sub-acts 511 and 512 are performed for each musical composition in the population of musical compositions.

At 511, the (i.e., each) musical composition is segmented into a sequence of musical segments. Segmentation may employ the systems, methods, and devices described in U.S. patent application Ser. No. 16/775,241 (as described previously), and/or segmentation may be achieved by converting a digital representation of the musical composition (e.g., .mid, .wav, .mp3, .mp4a, .hum, or the like) to a graphical 2D representation and then employing edge detection algorithms to identify musical segments in the graphical 2D representation by detecting (e.g., by at least one processor) edges or boundaries between adjacent musical segments in the graphical 2D representation.

At 512, a sample is generated, e.g., by at least one processor, by assembling a subsequence of the musical segments from 511. As described previously, the subsequence may comprise a respective first subset of bars from a respective beginning of each musical segment and a respective second subset of bars from a respective end of each musical segment. With a respective sample thus constructed for each musical composition in the population of musical compositions, method 500 proceeds to act 502.

At 502, a respective score is assigned, e.g., by at least one processor, to each musical composition in a similar way to that described for act 201 of method 200, with the specification that at 502 the score assigned to each musical composition is specifically based on a corresponding sample of the music composition rather than based on the musical composition in its entirety.

At 503, at least two parent compositions are selected from the population of musical compositions based on the scores assigned to their respective samples. Act 503 of method 500 is substantially similar to act 202 of method 200.

At 504, a set of child compositions is generated, e.g., by at least one processor, based on the at least two parent compositions selected at 503. Act 504 of method 500 is substantially similar to act 203 of method 200.

At 505, each respective child composition generated at 504 is sampled, e.g., by at least one processor. Similar to the sampling of the musical compositions at 501, sampling child compositions at 505 includes a respective iteration of each of sub-acts 551 and 552 for each respective child composition.

At 551, the (i.e., each) child composition is segmented into a sequence of child segments. Segmentation at 551 is substantially similar to segmentation at 511.

At 552, a sample is generated, e.g., by at least one processor, by assembling a subsequence of the child segments from 551. As described previously, the subsequence may comprise a respective first subset of bars from a respective beginning of each child segment and a respective second subset of bars from a respective end of each child segment. With a respective sample thus constructed for each child composition, method 500 proceeds to act 506.

At 506, a respective score is assigned, e.g., by at least one processor, to each child composition in a similar way to that described for act 205 of method 200, with the specification that at 506 the score assigned to each child composition is specifically based on a corresponding sample of the child composition rather than based on the child composition in its entirety.

At 507, a child composition that satisfies at least one criterion is returned as the musical composition generated by the implementation of method 500. In accordance with the present systems, devices, and methods, if no child composition that satisfies at least one criterion is identified after a first iteration of act 501, 502, 503, 504, 505, and 506, then method 500 may be reiterated in a similar way to methods 300 and 400 with each successive generation of child compositions replacing or adding to the population of musical compositions from which parent compositions are selected in successive iterations, until a child composition that satisfies at least one criterion is identified and returned.

The various implementations described herein improve the functioning of computer systems for the specific practical application of computer-based music composition, including but not limited to automated or algorithmic composition of music. For example, the identification of parent compositions that satisfy some particular criterion (e.g., score highly against some particular quality) and the algorithmic generation of child compositions based on crossbreeding (e.g., crossing and mutating/varying) such model parent compositions can advantageously generate new musical compositions in greater volume, with greater rapidity, and with greater emphasis on the particular quality being scored/assessed than other computer-based approaches to music composition available today. Overall, the present systems, devices, and methods can improve the functioning of a computer-based music composition system by: a) implementing automated segmentation algorithms to rapidly generate efficient samples of musical compositions to be used for scoring purposes, and b) implementing automated musical variation algorithms to rapidly generate large volumes of child compositions to enhance the likelihood that any particular child composition will demonstrate a desired quality in an exemplary way.

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, exemplary computer systems suitable for implementing the present systems, devices, and methods are provided in FIG. 6.

FIG. 6 is an illustrative diagram of a processor-based computer system 600 suitable at a high level for performing the various computer-implemented methods described in the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multiprocessor systems, microprocessor-based or programmable consumer electronics, personal computers ("PCs"), network PCs, minicomputers, mainframe computers, and the like.

Processor-based computer system 600 includes at least one processor 601, a non-transitory processor-readable storage medium or "system memory" 602, and a system bus 610 that communicatively couples various system components including the system memory 602 to the processor(s) 601. Processor-based computer system 601 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68xxx series microprocessors from Motorola Corporation.

The processor(s) 601 of processor-based computer system 600 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 6 may be presumed to be of conventional design. As a result, such blocks need not be described in further detail herein as they will be understood by those skilled in the relevant art.

The system bus 610 in the processor-based computer system 600 may employ any known bus structures or architectures, including a memory bus with memory controller, a peripheral bus, and/or a local bus. The system memory 602 includes read-only memory ("ROM") 621 and random access memory ("RAM") 622. A basic input/output system ("BIOS") 623, which may or may not form part of the ROM 621, may contain basic routines that help transfer information between elements within processor-based computer system 600, such as during start-up. Some implementations may employ separate buses for data, instructions and power.

Processor-based computer system 600 (e.g., system memory 602 thereof) may include one or more solid state memories, for instance, a Flash memory or solid state drive (SSD), which provides nonvolatile storage of processor-executable instructions, data structures, program modules and other data for processor-based computer system 600. Although not illustrated in FIG. 6, processor-based computer system 600 may, in alternative implementations, employ other non-transitory computer- or processor-readable storage media, for example, a hard disk drive, an optical disk drive, or a memory card media drive.

Program modules in processor-based computer system 600 may be stored in system memory 602, such as an operating system 624, one or more application programs 625, program data 626, other programs or modules 627, and drivers 628.

The system memory 602 in processor-based computer system 600 may also include one or more communications program(s) 629, for example, a server and/or a Web client or browser for permitting processor-based computer system 600 to access and exchange data with other systems such as user computing systems, Web sites on the Internet, corporate intranets, or other networks as described below. The communications program(s) 629 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 6 as being stored locally in system memory 602, operating system 624, application programs 625, program data 626, other programs/modules 627, drivers 628, and communication program(s) 629 may be stored and accessed remotely through a communication network or stored on any other of a large variety of non-transitory processor-readable media (e.g., hard disk drive, optical disk drive, SSD and/or flash memory).

Processor-based computer system 600 may include one or more interface(s) to enable and provide interactions with a user, peripheral device(s), and/or one or more additional processor-based computer system(s). As an example, processor-based computer system 610 includes interface 630 to enable and provide interactions with a user of processor-based computer system 600. A user of processor-based computer system 600 may enter commands, instructions, data, and/or information via, for example, input devices such as computer mouse 631 and keyboard 632. Other input devices may include a microphone, joystick, touch screen, game pad, tablet, scanner, biometric scanning device, wearable input device, and the like. These and other input devices (i.e., "I/O devices") are communicatively coupled to processor(s) 601 through interface 630, which may include one or more universal serial bus ("USB") interface(s) that communicatively couples user input to the system bus 610, although other interfaces such as a parallel port, a game port or a wireless interface or a serial port may be used. A user of processor-based computer system 600 may also receive information output by processor-based computer system 600 through interface 630, such as visual information displayed by a display 633 and/or audio information output by one or more speaker(s) 634. Monitor 633 may, in some implementations, include a touch screen.

As another example of an interface, processor-based computer system 600 includes network interface 640 to enable processor-based computer system 600 to operate in a networked environment using one or more of the logical connections to communicate with one or more remote computers, servers and/or devices (collectively, the "Cloud" 641) via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, network interface 640 may include one or more wired or wireless communications interfaces, such as network interface controllers, cellular radios, WI-FI radios, and/or Bluetooth radios for establishing communications with the Cloud 641, for instance, the Internet or a cellular network.

In a networked environment, program modules, application programs or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, processor(s) 601, system memory 602, interface 630, and network interface 640 are illustrated as communicatively coupled to each other via the system bus 610, thereby providing connectivity between the above-described components. In alternative implementations, the above-described components may be communicatively coupled in a different manner than illustrated in FIG. 6. For example, one or more of the above-described components may be directly coupled to other components, or may be coupled to each other via intermediary components (not shown). In some implementations, system bus 610 may be omitted with the components all coupled directly to each other using suitable connections.

In accordance with the present systems, devices, and methods, processor-based computer system 600 may be used to implement or in association with any or all of methods 100, 200, 300, 400, and/or 500 described herein and/or to define, encode, and/or manipulate any or all of the data objects, musical compositions, and/or scores described herein. Where the descriptions of methods 100, 200, 300, 400, and 500 make reference to an act being performed by at least one processor, such act may be performed by processor(s) 601 of computer system 600. Where the descriptions of methods 100, 200, 300, 400 and 500 make reference an act being performed by, performed on, or otherwise involving a non-transitory processor-readable storage medium, such act may be performed by, performed on, or otherwise involve system memory 602 of computer system 600.

Computer system 600 is an illustrative example of a system for performing all or portions of the various methods described herein, the system comprising at least one processor 601, at least one non-transitory processor-readable storage medium 602 communicatively coupled to the at least one processor 601 (e.g., by system bus 610), and the various other hardware and software components illustrated in FIG. 6 (e.g., operating system 624, mouse 631, etc.). In particular, in order to enable system 600 to implement the present systems, devices, and methods, system memory 602 stores a computer program product 650 comprising processor-executable instructions and/or data 651 that, when executed by processor(s) 601, cause processor(s) 601 to perform the various processor-based acts of methods 100, 200, 300, 400, and/or 500 as described herein. In the illustrated implementation of computer system 600, system memory 602 also stores a population of musical compositions (i.e., "music") 652 which is accessed by computer program product 650.

Throughout this specification and the appended claims, the term "computer program product" is used to refer to a package, combination, or collection of software comprising processor-executable instructions and/or data that may be accessed by (e.g., through a network such as cloud 641) or distributed to and installed on (e.g., stored in a local non-transitory processor-readable storage medium such as system memory 602) a computer system (e.g., computer system 600) in order to enable certain functionality (e.g., application(s), program(s), and/or module(s)) to be executed, performed, or carried out by the computer system.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, unless the specific context requires otherwise the term "note" is generally used to refer to a musical note (such as Ab, A, A #, Bb, B, C, C #, Db, D, D #, Eb, E, F, F #, Gb, G, G #(of any octave), and theoretical notes such as Cb, which is enharmonic to B) and is inclusive of rests (i.e., a note with a certain timing but no pitch or volume). A person of skill in the art will appreciate that the "parameters" of a note, or "note parameters," may include any or all concepts used to characterize notes in modern musical theory, including without limitation: pitch, start time, stop time, duration, volume, attack, reverb, decay, sustain, and instrument (e.g., tone, timbre, relative harmonics, and the like). Thus, a "note data object" is a data object that encodes a note, including its applicable note parameters.

A musical composition may include percussion events that have no tonal pitch but are used to impart rhythm. Throughout this specification and the appended claims, unless the specific context requires otherwise the term "note" is inclusive of percussion events. A percussion event may be defined or characterized by note parameters that generally do not include a pitch and generally specify a percussion instrument as the instrument.

Throughout this specification and the appended claims, reference is often made to a "track." Unless the specific context requires otherwise, the term track is used herein to refer to a collection or sequence of notes that are all "played by" the same instrument in a musical composition. For example, a musical composition that is for or by a single instrument may have only one track, but a musical composition that is for or by multiple instruments concurrently may have multiple tracks that are temporally overlaid on one another. Each respective bar of a musical composition may include multiple tracks, where each track provides the sequence of notes of a respective instrument throughout the duration of that bar.

Throughout this specification and the appended claims, unless the specific context requires otherwise the term "bar" is generally used to refer to a musical bar; i.e., a portion of time comprising a set number of beats from a musical composition. The number of beats in a bar depends on the time signature for the musical composition. A person of skill in the art will appreciate that the "parameters" of a bar, or "bar parameters," may include any or all concepts used to characterize bars in modern musical theory, including without limitation: bar index, time signature, beats per minute, duration, start time, stop time, beat times, key, scale, chords, tracks, sequence of notes, and (if applicable) sequence of percussion events.

Throughout this specification and the appended claims, the term "first" and related similar terms, such as "second," "third," and the like, are often used to identify or distinguish one element or object from other elements or objects (as in, for example, "first note" and "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first note" simply refers to one particular note among other notes and does not necessarily require that such one particular note be positioned ahead of or before any other note in a sequence of notes; thus, a "first note" of a musical composition or bar is one particular note from the musical composition or bar and not necessarily the lead or chronologically-first note of the musical composition or bar.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A computer-implemented method of generating a musical composition, the method comprising:
   assigning a respective fitness score to each musical composition in a population of musical compositions, each respective fitness score representative of a degree to which a corresponding musical composition exhibits a particular quality;

selecting, based on their respective fitness scores, at least two parent compositions from the population of musical compositions;

generating a set of child compositions based on the at least two parent compositions, wherein generating a set of child compositions based on the at least two parent compositions includes, for each child composition in the set of child compositions, crossing-over musical components between at least two parent compositions to generate the child composition;

assigning a respective fitness score to each child composition; and returning a child composition that satisfies at least one criterion.

2. The method of claim 1 wherein if no child composition initially satisfies at least one criterion then the method further comprises:

repeating, with each successive population of musical compositions re-cast to include at least an immediately preceding set of child compositions and until a child composition that satisfies at least one criterion is returned:

selecting, based on their respective fitness scores, at least two parent compositions from the re-cast population of musical compositions;

generating a set of child compositions based on the at least two parent compositions selected from the re-cast population of musical compositions, wherein generating a set of child compositions based on the at least two parent compositions selected from the re-cast population of musical compositions includes, for each child composition in the set of child compositions based on the at least two parent compositions selected from the re-cast population of musical compositions, crossing-over musical components between at least two parent compositions selected from the re-cast population of musical compositions to generate the child composition; and assigning a respective fitness score to each child composition in the set of child compositions generated based on the at least two parent compositions selected from the re-cast population of musical compositions.

3. The method of claim 2 wherein at least one criterion is selected from a group consisting of: exceeding a minimum fitness score threshold, realizing a maximum fitness score after a maximum number of iterations, and realizing a maximum fitness score after a maximum number of child compositions generated.

4. The method of claim 2 wherein repeating, with each successive population of musical compositions re-cast to include at least an immediately preceding set of child compositions, includes repeating, with each successive population of musical compositions re-cast to consist of only the immediately preceding set of child compositions.

5. The method of claim 1, further comprising:
applying a variation to at least one child composition before assigning a respective fitness score to each child composition.

6. The method of claim 1 wherein the population of musical compositions includes at least one musical composition composed by at least one human artist.

7. The method of claim 1 wherein the population of musical compositions includes at least one musical composition generated by at least one computer system executing at least one algorithm for automated music composition.

8. The method of claim 1 wherein the particular quality is selected from a group consisting of: an emotion, a genre, a mood, a style, an instrument, a culture, an ethnicity, a time period, an era, and a season.

9. The method of claim 1, further comprising:
sampling each musical composition in the population of musical compositions, wherein assigning a respective fitness score to each musical composition in a population of musical compositions includes, for each musical composition in the population of musical compositions, assigning the respective fitness score based on a corresponding sample of the musical composition.

10. The method of claim 9 wherein sampling each musical composition in the population of musical compositions includes, for each musical composition in the population of musical compositions:

segmenting the musical composition into a sequence of musical segments; and assembling a sample comprising a subsequence of the musical segments, the subsequence comprising a respective first subset of bars from a respective beginning of each musical segment and a respective second subset of bars from a respective end of each musical segment.

11. The method of claim 1 wherein, for each child composition in the set of child compositions, crossing-over musical components between at least two parent compositions to generate the child composition includes swapping a musical component of a first parent composition with a corresponding musical component of a second parent composition, wherein the musical component is selected from a group consisting of: a bar, a track, a segment, a sequence of bars, a chord, a chord progression, and an orchestration.

12. An iterative computer-implemented method of generating a musical composition, the method comprising:

assigning a respective fitness score to each musical composition in a population of musical compositions, each respective fitness score representative of a degree to which a corresponding musical composition exhibits a particular quality;

until a child composition that satisfies at least one criterion is identified, repeating, with each successive population of musical compositions at least including an immediately preceding set of child compositions:

selecting, based on their respective fitness scores, at least two parent compositions from the population of musical compositions;

generating a set of child compositions based on the at least two parent compositions, wherein generating a set of child compositions based on the at least two parent compositions includes, for each child composition in the set of child compositions, crossing-over musical components between at least two parent compositions to generate the child composition;

assigning a respective fitness score to each child composition; and evaluating whether each child composition satisfies at least one criterion;

and returning the child composition that satisfies at least one criterion.

13. The method of claim 12, further comprising, for each respective iteration:

applying a variation to at least one child composition before assigning a respective fitness score to each child composition.

14. The method of claim 12, further comprising:
before assigning a respective fitness score to each musical composition in the population of musical compositions, sampling each musical composition in the population of musical compositions, wherein assigning a respective fitness score to each musical composition in the population of musical compositions includes, for each musical composition in the population of musical compositions, assigning the respective fitness score based on a corresponding sample of the musical composition; and
for each iteration:
before assigning a respective fitness score to each child composition, sampling each musical composition in the set of child compositions, wherein assigning a respective fitness score to each child composition includes, for each child composition, assigning the respective fitness score based on a corresponding sample of the child composition.

15. The method of claim 14 wherein:
sampling each musical composition in the population of musical compositions includes, for each musical composition in the population of musical compositions:
 segmenting the musical composition into a sequence of musical segments; and
 assembling a sample comprising a subsequence of the musical segments, the subsequence comprising a respective first subset of bars from a respective beginning of each musical segment and a respective second subset of bars from a respective end of each musical segment;
and
sampling each musical composition in the set of child compositions includes, for each child composition:
 segmenting the child composition into a sequence of child segments; and
 assembling a sample comprising a subsequence of the child segments, the subsequence comprising a respective first subset of bars from a respective beginning of each child segment and a respective second subset of bars from a respective end of each child segment.

16. A system for generating a musical composition, the system comprising:
at least one processor; and
a non-transitory processor-readable storage medium communicatively coupled to the at least one processor, the non-transitory processor-readable storage medium storing a population of musical compositions and processor-executable instructions and/or data that, when executed by the at least one processor, cause the at least one processor to:
 assign a respective fitness score to each musical composition in the population of musical compositions, each respective fitness score representative of a degree to which a corresponding musical composition exhibits a particular quality;
 select, based on their respective fitness scores, at least two parent compositions from the population of musical compositions;
 generate a set of child compositions based on the at least two parent compositions, wherein generating a set of child compositions based on the at least two parent compositions includes, for each child composition in the set of child compositions, crossing-over musical components between at least two parent compositions to generate the child composition;
 assign a respective fitness score to each child composition; and
 return a child composition that satisfies at least one criterion.

17. The system of claim 16, further comprising processor-executable instructions and/or data that, when executed by the at least one processor, cause the at least one processor to, before returning a child composition that satisfies at least one criterion:
 evaluate whether at least one child composition satisfies the at least one criterion;
 if no child composition satisfies the at least one criterion, iteratively, with each successive population of musical compositions re-cast to at least include an immediately preceding set of child compositions and until a child composition that satisfies the at least one criterion is identified:
  select, based on their respective fitness scores, at least two parent compositions from the re-cast population of musical compositions;
  generate a set of child compositions based on the at least two parent compositions, wherein generating a set of child compositions based on the at least two parent compositions includes, for each child composition in the set of child compositions, crossing-over musical components between at least two parent compositions to generate the child composition;
  assign a respective fitness score to each child composition; and
  evaluate whether at least one child composition satisfies the at least one criterion.

18. The system of claim 16, further comprising processor-executable instructions and/or data that, when executed by the at least one processor, cause the at least one processor to:
 apply a variation to at least one child composition before assigning a respective fitness score to each child composition.

* * * * *